(12) United States Patent
Carns et al.

(10) Patent No.: US 7,213,787 B2
(45) Date of Patent: May 8, 2007

(54) VALVES FOR ANNULAR CONDUITS INCLUDING AIRCRAFT FUEL CONDUITS AND ASSOCIATED SYSTEMS AND METHODS

(75) Inventors: James A. Carns, Seattle, WA (US); Theron L. Cutler, Seattle, WA (US); Mark A. Shelly, Seattle, WA (US); Benjamin P. Van Kampen, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/147,138

(22) Filed: Jun. 7, 2005

(65) Prior Publication Data

US 2006/0284018 A1   Dec. 21, 2006

(51) Int. Cl.
*B64D 37/02* (2006.01)
(52) U.S. Cl. .............................. 244/135 R; 244/135 A; 244/135 C
(58) Field of Classification Search ............ 244/135 R, 244/135 C
See application file for complete search history.

(56) References Cited

U.S. PATENT DOCUMENTS

| | | | |
|---|---|---|---|
| 724,675 A | 4/1903 | Decker | |
| 1,899,978 A | 3/1933 | Noyes | |
| 2,213,680 A * | 9/1940 | Share | 251/190 |
| 2,360,733 A | 10/1944 | Smith | |
| 2,453,553 A * | 11/1948 | Tansley | 222/133 |
| 2,475,635 A | 7/1949 | Parsons | |
| 2,552,991 A * | 5/1951 | McWhorter | 251/158 |
| 2,668,066 A | 2/1954 | Stadelhofer | |
| 3,836,117 A * | 9/1974 | Panicali | 251/351 |
| 3,928,903 A | 12/1975 | Richardson et al. | |
| 4,044,834 A * | 8/1977 | Perkins | 166/370 |
| 4,072,283 A | 2/1978 | Weiland | |
| 4,119,294 A * | 10/1978 | Schnorrenberg | 251/129.08 |
| 4,149,739 A | 4/1979 | Morris | |

(Continued)

FOREIGN PATENT DOCUMENTS

DE      27 44 674 A1    4/1979

(Continued)

OTHER PUBLICATIONS http://www.meriweather.com/747/over/fuel.html# first available Feb. 22, 2001.*

(Continued)

*Primary Examiner*—Teri Pham Luu
*Assistant Examiner*—Edward J. Mayle
(74) *Attorney, Agent, or Firm*—Perkins Coie LLP

(57) ABSTRACT

Valves for annular conduits and associated systems and methods are disclosed. A fluid transmission system in accordance with one embodiment of the invention includes a first conduit having a first wall aligned with a flow direction in the first conduit and a second conduit disposed annularly around the first conduit with a second wall aligned with the flow direction. An access channel can be positioned to have an aperture in fluid communication with the first conduit and can be isolated from fluid communication with the second conduit. A valve element can be positioned in fluid communication with the access channel and can be movable between a first position and a second position, with the valve element being positioned to allow a first amount of flow through the access channel when in the first position and being positioned to allow no flow or a second amount of flow less than the first amount of flow through the access channel when in the second position. The valve can be installed in aircraft fuel lines or other systems.

15 Claims, 4 Drawing Sheets

U.S. PATENT DOCUMENTS

| | | | |
|---|---|---|---|
| 4,150,803 A | | 4/1979 | Fernandez |
| 4,471,809 A | * | 9/1984 | Thomsen et al. ...... 137/625.32 |
| 4,477,040 A | | 10/1984 | Karanik |
| 4,665,936 A | * | 5/1987 | Furrer ........................... 137/1 |
| 4,784,174 A | | 11/1988 | Ryan et al. |
| 4,883,102 A | * | 11/1989 | Gabrielyan et al. ........... 141/98 |
| 4,929,000 A | | 5/1990 | Annestedt, Sr. |
| 5,131,438 A | | 7/1992 | Loucks |
| 5,141,178 A | | 8/1992 | Alden et al. |
| 5,255,877 A | | 10/1993 | Lindgren et al. |
| 5,393,015 A | | 2/1995 | Piasecki |
| 5,427,333 A | | 6/1995 | Kirkland |
| 5,449,203 A | | 9/1995 | Sharp |
| 5,449,204 A | | 9/1995 | Greene et al. |
| 5,530,650 A | | 6/1996 | Biferno et al. |
| 5,539,624 A | | 7/1996 | Dougherty |
| 5,564,753 A | | 10/1996 | Juttelstad |
| 5,573,206 A | | 11/1996 | Ward |
| 5,785,276 A | | 7/1998 | Ruzicka |
| 5,810,292 A | | 9/1998 | Garcia, Jr. et al. |
| 5,904,729 A | | 5/1999 | Ruzicka |
| 5,906,336 A | | 5/1999 | Eckstein |
| 5,921,294 A | | 7/1999 | Greenhalgh et al. |
| 5,996,939 A | | 12/1999 | Higgs et al. |
| 6,076,555 A | * | 6/2000 | Hettinger ............... 137/625.69 |
| 6,119,981 A | | 9/2000 | Young et al. |
| 6,145,788 A | | 11/2000 | Mouskis et al. |
| 6,302,448 B1 | | 10/2001 | Van Der Meer et al. |
| 6,305,336 B1 | * | 10/2001 | Hara et al. ............... 123/90.11 |
| 6,324,295 B1 | | 11/2001 | Valery et al. |
| 6,326,873 B1 | * | 12/2001 | Faria ........................... 335/251 |
| 6,375,123 B1 | | 4/2002 | Greenhalgh et al. |
| 6,428,054 B1 | | 8/2002 | Zappa et al. |
| 6,454,212 B1 | | 9/2002 | Bartov |
| 6,464,173 B1 | | 10/2002 | Bandak |
| 6,467,725 B1 | | 10/2002 | Coles et al. |
| 6,588,465 B1 | | 7/2003 | Kirkland et al. |
| 6,598,830 B1 | | 7/2003 | Ambrose et al. |
| 6,601,800 B2 | | 8/2003 | Ollar |
| 6,604,711 B1 | | 8/2003 | Sinha et al. |
| 6,651,933 B1 | | 11/2003 | von Thal et al. |
| 6,669,145 B1 | | 12/2003 | Green |
| 6,676,379 B2 | | 1/2004 | Eccles et al. |
| 6,752,357 B2 | | 6/2004 | Thal et al. |
| 6,796,527 B1 | | 9/2004 | Munoz et al. |
| 6,819,982 B2 | | 11/2004 | Doane |
| 6,832,743 B2 | | 12/2004 | Schneider et al. |
| 6,848,720 B2 | * | 2/2005 | Carns et al. ........... 285/123.15 |
| 2003/0038214 A1 | | 2/2003 | Bartov |
| 2003/0097658 A1 | | 5/2003 | Richards |
| 2003/0136874 A1 | | 7/2003 | Gjerdrum |
| 2004/0129865 A1 | | 7/2004 | Doane |
| 2005/0055143 A1 | | 3/2005 | Doane |
| 2006/0000949 A1 | | 1/2006 | Schroeder |
| 2006/0011782 A1 | | 1/2006 | Schroeder |
| 2006/0038076 A1 | | 2/2006 | Schroeder |

FOREIGN PATENT DOCUMENTS

| | | |
|---|---|---|
| DE | 10013751 | 10/2001 |
| EP | 0807577 | 11/1997 |
| EP | 1094001 | 4/2001 |
| EP | 1361156 | 11/2003 |
| FR | 2 569 161 | 2/1986 |
| GB | 2373488 | 9/2002 |
| IT | 128459 | 5/2003 |
| RU | 2111154 | 5/1998 |
| RU | 2140381 | 10/1999 |
| RU | 2142897 | 12/1999 |
| TW | 386966 | 4/2000 |
| WO | WO-85/02003 | 5/1985 |
| WO | WO-91/06471 | 5/1991 |
| WO | WO-97/33792 | 9/1997 |
| WO | WO-98/07623 | 2/1998 |
| WO | WO-98/35178 | 8/1998 |
| WO | WO-98/39208 | 9/1998 |
| WO | WO-98/54053 | 12/1998 |
| WO | WO-02/24529 | 3/2002 |
| WO | WO-02/76826 | 10/2002 |
| WO | WO-03/102509 | 12/2003 |

OTHER PUBLICATIONS http://www.meriweather.com/747/over/fuel-layout.html first available Feb. 22, 2001.* http://www.boeing.com/commercial/767family/pf/pf_background.html first available Feb. 12, 2002.* http://www.boeing.com/commercial/767family/background.html first available Aug. 5, 2002.*

U.S. Appl. No. 10/857,226, Schroeder.

U.S. Appl. No. 10/890,664, Schroeder.

U.S. Appl. No. 10/896,584, Schroeder.

U.S. Appl. No. 11/067,331, Crangle et al.

U.S. Appl. No. 11/078,210, Smith.

Flug Revue, "Airbus (Air Tanker) A330-200 Tanker," Jan. 26, 2004; www.flug-revue.rotor.com/FRTypen/FRA3302T.htm; Motorp-Presse Stuttgart, Bonn, German, (5 pgs).

Thales Avionics Ltd., "Air Tanker Bids for Future Strategic Tanker Aircraft," Jul. 3, 2001; www.thalesavionics.net/press/pr43.html; (3 pgs).

U.S. Appl. No. 11/067,331, filed Feb. 25, 2005, Crangle.

U.S. Appl. No. 11/157,245, filed Jun. 20, 2005, Takacs et al.

U.S. Appl. No. 11/217,696, filed Sep. 1, 2005, Schuster et al.

U.S. Appl. No. 11/258,819, filed Oct. 26, 2005, Cutler et al.

Keller, George R., "Hydraulic System Analysis", pp. 40-41, 1985, Hydraulics & Pheumatics, Cleveland, Ohio.

European Search Report for EPO06 25 2941; The Boeing Company; 10 pgs; Oct. 16, 2006; European Patent Office.

* cited by examiner

VALVES FOR ANNULAR CONDUITS INCLUDING AIRCRAFT FUEL CONDUITS AND ASSOCIATED SYSTEMS AND METHODS

TECHNICAL FIELD

The present invention is directed generally toward valves for annular conduits and associated systems and methods, including aircraft-based systems.

BACKGROUND

Modern aircraft include complex fuel systems that route aviation fuel from fuel tanks to aircraft systems that use the fuel. These aircraft systems can include the primary engines, and/or auxiliary power units (APUs). In the case of an aerial refueling tanker, these systems can also include the fuel lines, manifolds, and associated valving necessary for delivering fuel to a receiver aircraft. In some cases, the fuel lines may pass through "ignition zones," which are typically pressurized compartments in the aircraft (e.g., baggage compartments) that may also house electrical devices. Federal Aviation Administration (FAA) regulations require that fuel lines in such areas must be shrouded and capable of being drained. Accordingly, there is a need in the industry for fuel lines that are both shrouded and convenient to access for draining.

SUMMARY

Aspects of the present invention are directed to valves for annular conduits, and associated systems and methods. An aircraft in accordance with one aspect includes a fuselage portion, a wing portion, and a fuel tank carried by at least one of the fuselage portion and the wing portion. A first conduit can be coupled to the fuel tank and can have a first wall aligned with a flow direction in the first conduit. A second conduit can be disposed annularly around the first conduit, and can have a second wall aligned with the flow direction. The aircraft can further include an access channel having an aperture in fluid communication with the first conduit and isolated from fluid communication with the second conduit. A valve element can be located in fluid communication with the access channel, and can be movable between a first position and a second position. In the first position, the valve element can allow a first amount of flow through the access channel, and in the second position, the valve element can allow no flow or a second amount of flow less than the first amount of flow through the access channel.

A fluid transmission system in accordance with another aspect of the invention can include a first conduit having a first wall aligned with a first flow direction in the first conduit, a second conduit disposed annularly around the first conduit and having a second wall aligned with the flow direction, and an access channel having an aperture in fluid communication with the first conduit. The first conduit can be isolated from fluid communication with the second conduit. A valve element can be positioned in fluid communication with the access channel and can be movable between a first position and a second position. When the valve is in the first position, it can allow a first amount of flow through the access channel, and when the valve is in the second position, it can allow no flow or a second amount of flow less than the first amount of flow through the access channel.

A method for moving fluid to or from a conduit in accordance with another aspect of the invention can include moving a valve element of a valve from a second position to a first position, with the valve element being in fluid communication with an access channel that is in turn in fluid communication with a first conduit. When the valve is in the second position, the method can further include passing fluid (a) to or from the first conduit, (b) through the valve via the access channel while the access channel is in fluid communication with the first conduit, and (c) through a wall of a second conduit disposed annularly around the first conduit, without passing the fluid to or from the second conduit.

DETAILED DESCRIPTION

The present disclosure describes valves for annular conduits, and associated systems and methods. Certain specific details are set forth in the following description and in FIGS. 1–5 to provide a thorough understanding of various embodiments of the invention. Well-known structures, systems and methods often associated with such systems have not been shown or described in detail to avoid unnecessarily obscuring the description of the various embodiments of the invention. In addition, those of ordinary skill in the relevant art will understand that additional embodiments of the invention may be practiced without several of the details described below.

Figure 1:
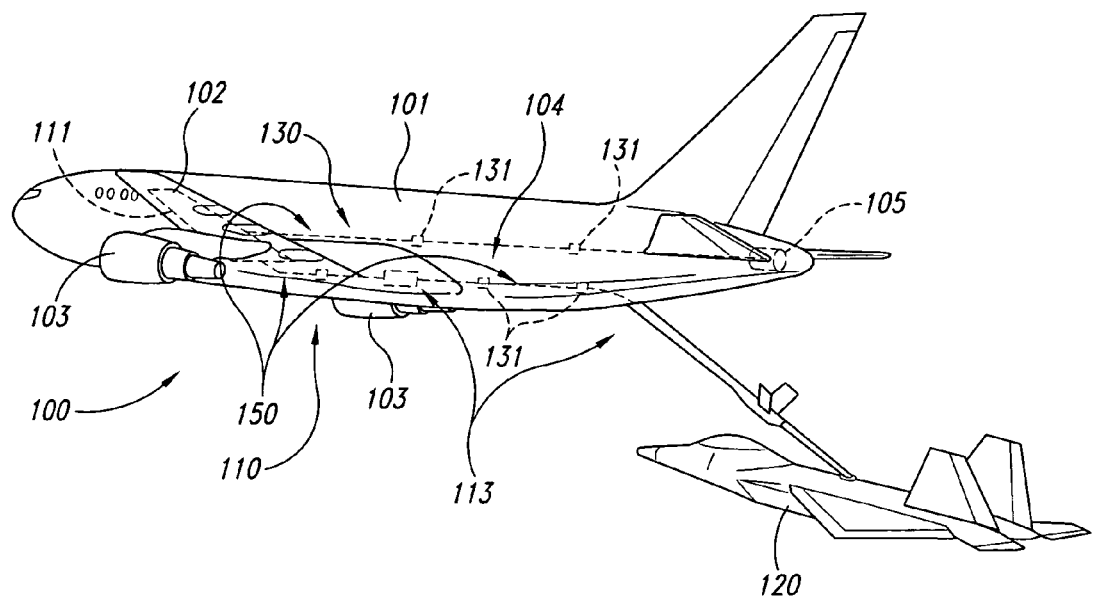
FIG. 1 is a partially schematic, isometric illustration of a refueling aircraft positioned to refuel a receiver aircraft and having a fuel system configured in accordance with an embodiment of the invention.

FIG. 1 illustrates an aircraft 100 (e.g., a refueling aircraft) in the process of refueling a receiver aircraft 120. The aircraft 100 can include a fuselage 101, wings 102, and one or more engines 103 (two are shown in FIG. 1 as being carried by the wings 102). In other embodiments, the aircraft 100 can have other configurations and in at least some embodiments, need not include a refueling capability. In a particular aspect of the embodiment shown in FIG. 1, the aircraft includes a fuel system 110 having wing-mounted fuel tanks 111 and fuel lines 150 that provide fuel to other aircraft systems. These systems can include the engines 103, an auxiliary power unit (APU) 105 and an aerial refueling system 113. The fuel system 110 can also include a valve system 130 coupled to the fuel lines 150 to control the flow of fuel into and out of the fuel lines 150. In particular embodiments, the valve system 130 includes valves 131 that can be used to drain fuel from the fuel system 110 in a manner that reduces and/or eliminates the likelihood for leaking fuel and/or fuel vapors into pressurized compartments 104 through which the fuel lines 150 pass. Further details of the fuel lines 150 and the valve system 130 are described below with reference to FIGS. 2–5.

Figure 2:
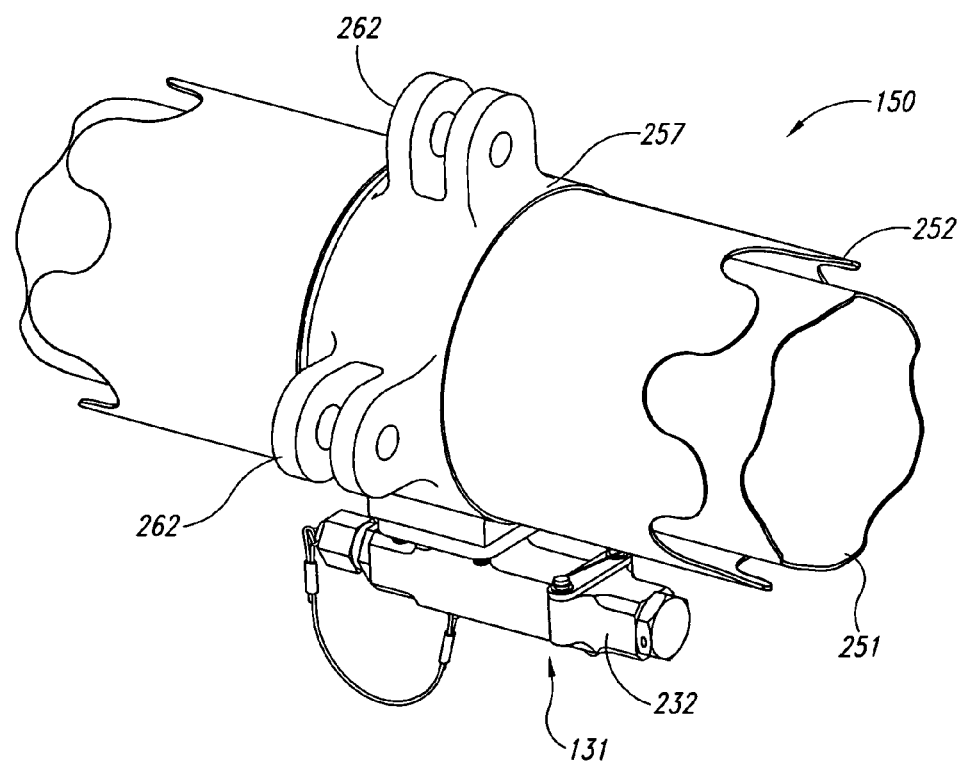
FIG. 2 is an isometric illustration of a fuel line and a valve configured in accordance with an embodiment of the invention.

FIG. 2 is an isometric illustration of a portion of the fuel line 150 and a valve 131 configured in accordance with an embodiment of the invention. The fuel line 150 can include a first or inner conduit 251 surrounded by a second or outer conduit 252. The inner conduit 251 can be configured to carry fuel or in other installations, another liquid. The outer conduit 252 can provide a protective shroud around the inner conduit 251 in case of a liquid and/or vapor leak in the inner conduit 251. Accordingly, the inner conduit 251 and the outer conduit 252 are normally isolated from fluid communication with each other.

The valve 131 can include a line-replaceable valve unit 232 coupled to the fuel line 150 with a channel housing 257. The valve 131 can be configured to be in fluid communication with only the inner conduit 251 and not the outer conduit 252 of the fuel line 150. Accordingly, the channel housing 257 can include an internal channel that provides for isolated fluid communication between the valve 131 and the inner conduit 252. The channel housing 257 can also include attachment fixtures 262 for coupling the fuel line 150 and the valve unit 232 to adjacent aircraft structures. Further details of channel housing 257 and the valve unit 232 are described below with reference to FIG. 3.

Figure 3:
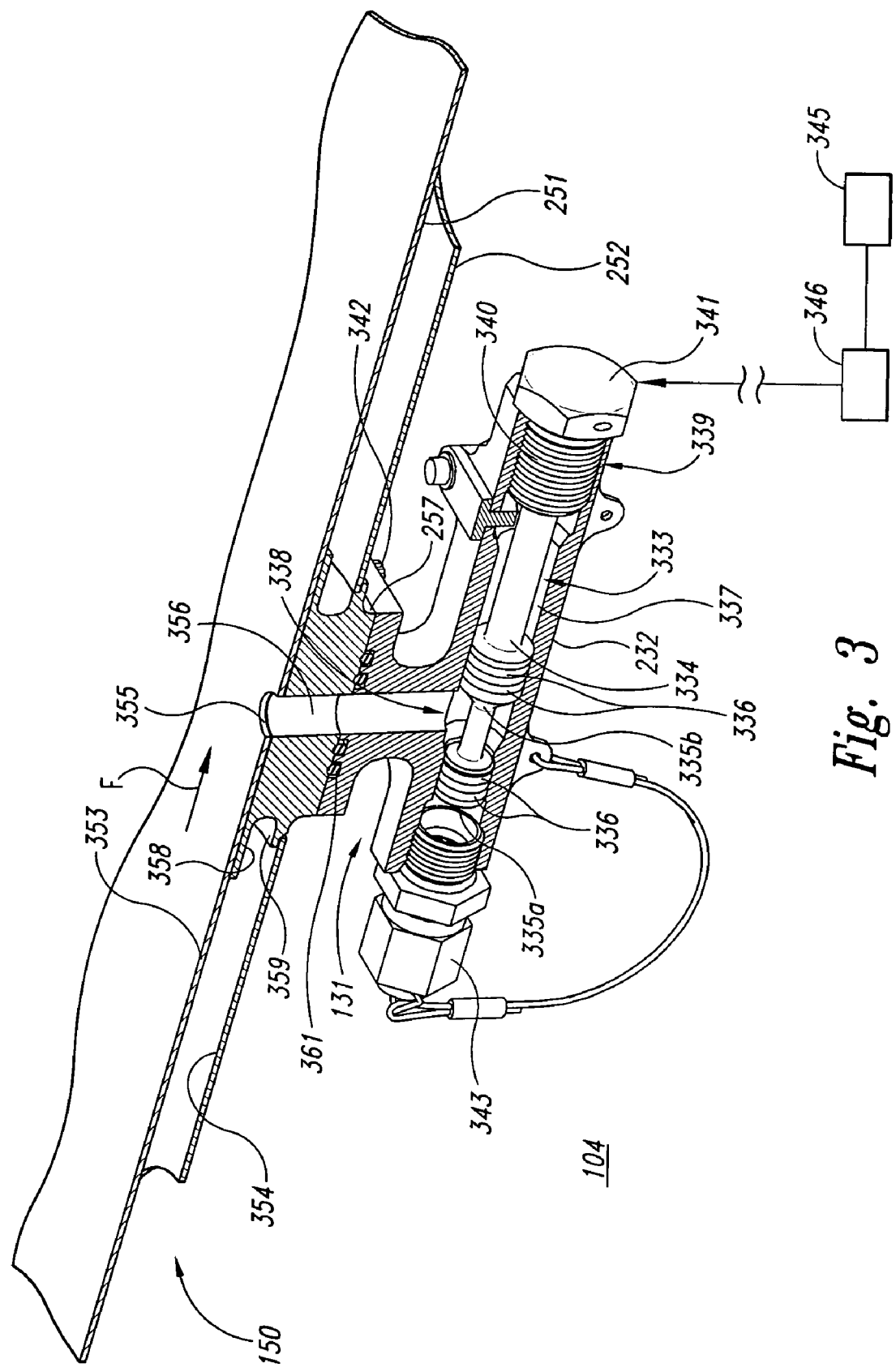
FIG. 3 is a partially schematic, cross-sectional illustration of a portion of the fuel line and valve shown in FIG. 2.

FIG. 3 is a partially schematic, cut away isometric illustration of a portion of the fuel line 150, the channel housing 257, and the valve unit 232 shown in FIG. 2. In one aspect of this embodiment, the first conduit 251 includes a first conduit wall 353 generally parallel to the fluid flow direction F in the first conduit 251, and the second conduit 252 includes a second conduit wall 354 generally parallel to the first conduit wall 353. The channel housing 257 can be coupled to the fuel line 150 so that a first flange 358 is sealably positioned against the first conduit wall 353, and a second flange 359 is sealably positioned against the second conduit wall 354. The second conduit wall 354 can include axially spaced apart sections, with the channel housing 257 sealably positioned between the sections. The first conduit wall 353 can include a wall opening 355 that is in fluid communication with an access channel 356 carried by the channel housing 257. Accordingly, the access channel 356 can provide fluid communication with the first conduit 251 (via the wall opening 355), but not with the second conduit 252.

The valve unit 232 can be releasably attached to the channel housing 257, for example, with removable fasteners 342. Multiple housing seals 361 (two are shown in FIG. 3) can provide for a redundant, leak-proof seal between the valve unit 232 and the channel housing 257. The valve unit 232 can include a continuation of the access channel 356, terminating in a passageway opening 338. The passageway opening 338 can provide fluid communication between the access channel 356 and a transversely positioned passageway 337. In one aspect of this embodiment, the passageway 337 can be oriented generally parallel to the first and second conduit walls 353, 354 to provide for a compact arrangement. In other embodiments, the passageway 337 can have other orientations, and/or the function provided by the passageway 337 can be provided by the access channel 356.

The passageway 337 can house a valve element 333 that controls the flow of fluid into and/or out of the first conduit 251. The valve element 333 can include a piston 334 having multiple piston heads 335 (shown as a first piston head 335a and a second piston head 335b), each carrying multiple, redundant, piston seals 336. When the valve 131 is in a closed position (as shown in FIG. 3), the first piston head 335a is located on one side of the passageway opening 338, and the second piston head 335b is located on the opposite side of the passageway opening 338. Accordingly, fluid cannot pass from the first conduit 251 out of the valve 131 as a result of the blocking position provided by the first head 335a, and because a cap 343 is inserted into the passageway 337. In the closed position, the valve 131 can prevent fluid and/or fluid vapor contamination of the pressurized compartment 104 in which the valve is located.

The piston 334 can be coupled to an actuator 339 that moves the piston between the closed position shown in FIG. 3 and an open position discussed in greater detail below with reference to FIG. 4. In one aspect of this embodiment, the actuator 339 can include a threaded portion 340 that threadably engages the walls of the passageway 337, and an actuator head 341 which a user can rotate by hand or with a wrench to move the piston 334 back and forth within the passageway 337. In another embodiment, the actuator 339 can be coupled to a remotely operable driver 346 that in turn is controlled at a control panel 345. Accordingly, the operator need not operate the actuator 339 by hand, but can instead direct operation of the actuator 339 via the remotely operable driver 346. The remotely operable driver can include a solenoid, electric motor, hydraulic motor, pneumatic motor, or other suitable device.

Figure 4:
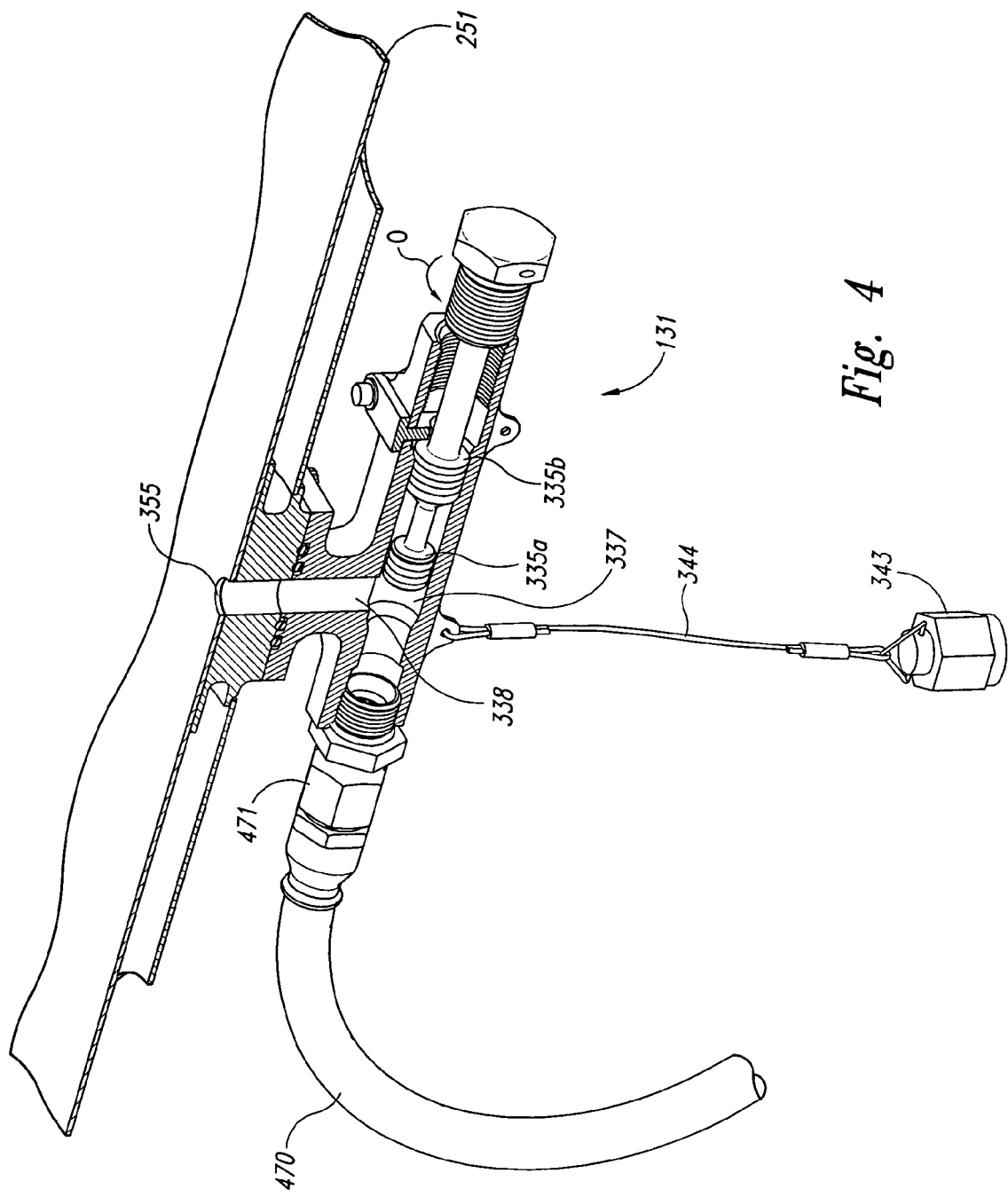
FIG. 4 is a partially schematic illustration of the valve shown in FIG. 3 placed in an open position in accordance with an embodiment of the invention.

FIG. 4 illustrates the valve 131 in its open position. The cap 343 has been removed from the passageway 337, but can remain close at hand by virtue of a retainer 344 attached between the valve 131 and the cap 343. A third conduit 470, e.g. a flexible hose, has been attached to the passageway 337 with an attachment fitting 471. To open the valve 131, the operator rotates the actuator 339 as indicated by arrow O to draw the piston 334 toward the right until the first piston head 335a is positioned (or at least partially positioned) on the same side of the passageway opening 338 as the second piston head 335b. Fuel can now drain from the first conduit 251 through the valve 131 and through the third conduit 470.

Figure 5:
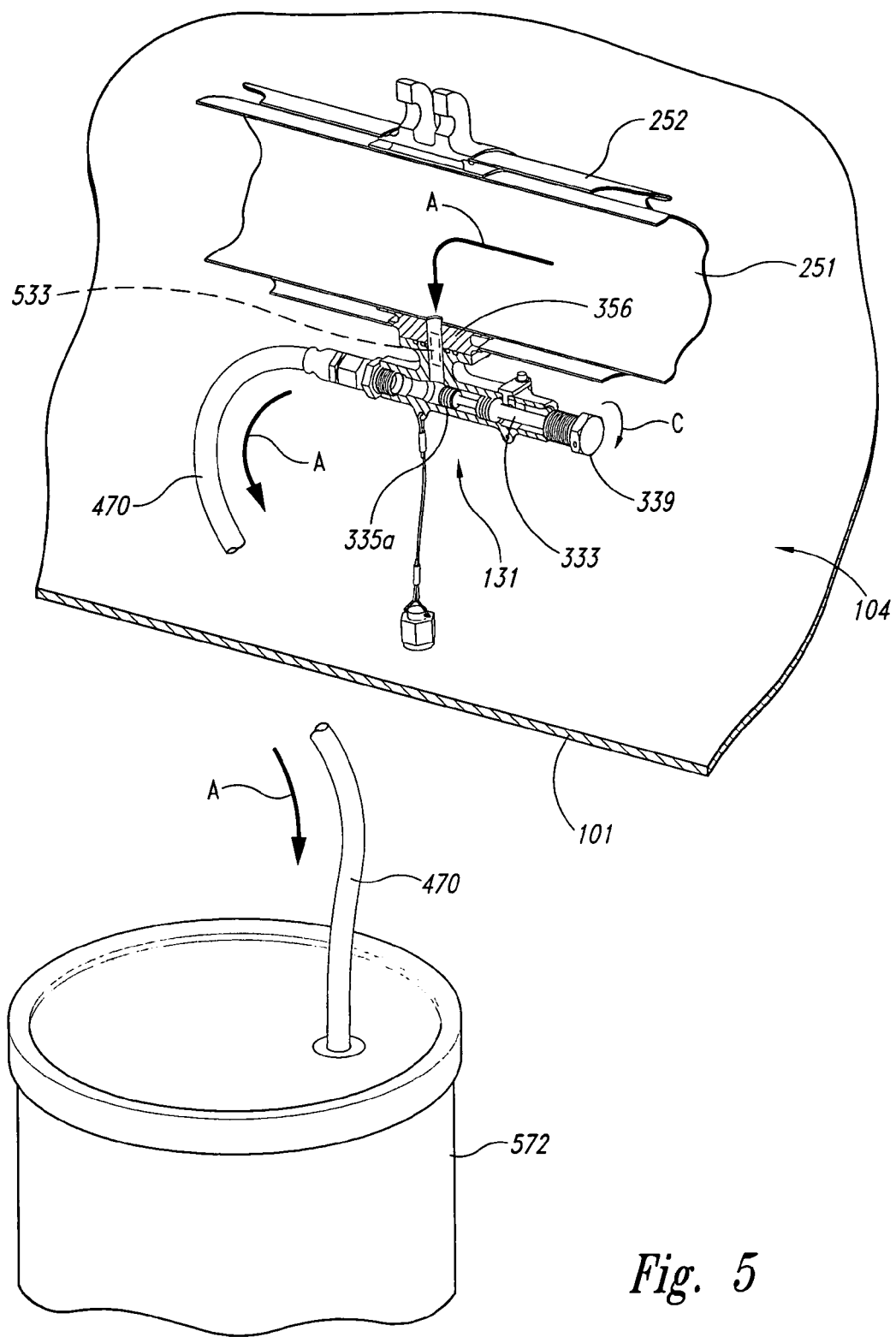
FIG. 5 is a partially schematic illustration of a fuel line and valve positioned to provide access to the fuel line from a location external to a pressurized compartment.

FIG. 5 illustrates the flow of fuel (identified by arrows A) as it passes outwardly from the first conduit 251 through the third conduit 470 outside the pressurized compartment 104 to an externally located drum 572 or other receptacle. Once the fluid has been drained from the first conduit 251, the valve 131 can be closed by rotating the actuator 339 in the direction indicated by arrow C to return the first piston head 335a to the position shown in FIG. 3.

One feature of at least some embodiments of the valve system described above with reference to FIGS. 1–5 is that the valve 131 can provide a fluid-tight and vapor-tight path between the shrouded first conduit 251 and a region external to the pressurized compartment 104 in which the valve 131 is housed. Accordingly, the valve 131 can be used to drain fuel from a fuel line without contaminating the region adjacent to the valve 131, with either liquid fuel or fuel vapors. An advantage of this arrangement is that it can reduce the likelihood for contaminating these regions with potentially harmful substances.

Another feature of at least some embodiments of the valve 131 described above with reference to FIGS. 1–5 is that it can include redundant seals at a number of locations. These locations can include a joint between the valve unit 232 and the channel housing 257, and the sliding interface between the piston heads 335a, 335b and the walls of the passageway 337 in which the piston 334 is housed. The redundant seals can reduce the likelihood for leakage from the valve 131 in the event that one or more seals become compromised.

Still another feature of at least some embodiments of the valve system described above with reference to FIGS. 1–5 is that the valves can be located at various positions within the aircraft 100 to provide various functions. For example, some of the valves shown in FIG. 1 can be provided in the fuel lines 150 connecting the fuel tanks 111 with the refueling system 113. Other valves can be positioned in fuel lines 150 connecting the fuel tanks 111 with the aircraft engines 103 and/or the aircraft APU 105. At least some of these valves can be used for different and/or multiple functions. For example, some of the valves may be used to drain fuel from the fuel lines 150, while other valves, positioned at higher elevations in the fuel system 110, can provide venting while fuel is draining from the lower valves. A single system may include several valves, e.g., located at several different system low points and/or high points.

In some embodiments, the valves can be used to supply fluid to the fuel lines 150 as well as remove fluid. In a particular embodiment, the valves can be used to provide pressurized air to the fuel lines 150 during leak checking or for other purposes. In other embodiments, substances other than fuel can be provided via the valves. In still further embodiments, the valves can be installed in lines other than fuel lines. Accordingly, the valves can be located in vehicles or devices other than an aircraft.

In one embodiment, the valve need not include a valve element 333 that moves generally parallel to the first and second conduits 251, 252. Instead, a valve element 533 (shown schematically in FIG. 5) can be positioned directly in the access channel 356, and can accordingly extend transverse to the first and second conduits 251, 252. In a particular aspect of this embodiment, the valve element 533 can include a head having axial apertures that seal against the first conduit wall 353 when the valve is closed. When the valve is opened, the head and apertures move away from the conduit wall to allow fuel to flow through.

In any of the foregoing embodiments, the valves can be adjustable not only between an open and closed position, but between a variety of open positions. In particular, the valve elements can be selectively positioned by the user to regulate the amount of flow passing through the valves, in addition to simply closing and opening the valve.

From the foregoing, it will be appreciated that specific embodiments of the invention have been described herein for purposes of illustration, but that various modifications may be made without deviating from the invention. For example, the valve may move in a fashion other than a linear fashion (e.g., a rotary fashion) between the open and closed positions. The actuator may move in fashions other than a rotary fashion, and may be guided by arrangements other than a threaded arrangement. The valve unit and access channel housing shown as separable units in the Figures can be integrated into a single unitary structure in other embodiments. Aspects of the invention described in the context of particular embodiments may be combined or eliminated in other embodiments. For example, aspects of the invention described in the context of the specific systems of the aircraft 100 can be implemented in other systems and/or can be implemented on devices or vehicles other than aircraft in other embodiments. Further, while advantages associated with certain embodiments of the invention have been described in the context of those embodiments, other embodiments may also exhibit such advantages, and not all embodiments need necessarily exhibit such advantages to fall within the scope of the invention. Accordingly, the invention is not limited, except as by the appended claims.

We claim:

1. An aircraft, comprising:
a fuselage portion;
a wing portion;
a fuel tank carried by at least one of the fuselage portion and the wing portion;
a first conduit coupled to the fuel tank, the first conduit having a first wall aligned with a flow direction in the first conduit;
a second conduit disposed annularly around the first conduit, the second conduit having a second wall aligned with the flow direction;
an access channel having an aperture in fluid communication with the first conduit, the access channel being isolated from fluid communication with the second conduit;
a valve element in fluid communication with the access channel, the valve element being movable between a first position and a second position, the valve element being positioned to allow a first amount of flow through the access channel when in the first position, the valve element being positioned to allow no flow or a second amount of flow less than the first amount of flow through the access channel when in the second position; and
a valve unit carrying the valve element, the valve unit including:
a passageway having an opening in fluid communication with the access channel; and wherein
the valve element includes a piston positioned in the passageway and movable between the first and second positions, the piston having first and second axially spaced apart heads, each sealably disposed against a wall of the passageway with multiple spaced apart seals, wherein the first and second heads are positioned on opposite sides of a reduced diameter portion of the piston that is not sealably disposed against the wall, wherein the first and second heads are on opposite sides of the opening in the passageway when the piston is in the second position, and wherein the first and second heads are on the same side of the opening in the passageway when the piston is in the first position.

2. The aircraft of claim 1, further comprising an aerial refueling system coupled to the first conduit to receive fuel from the fuel tank, and wherein the aircraft includes a pressurized compartment, the pressurized compartment housing at least one electrically operated component, and wherein the first conduit and the second conduit pass through the pressurized compartment and wherein the valve element and the valve unit are also located in the pressurized compartment, the valve element being movable within the passageway of the valve unit, further wherein the aircraft includes a third conduit coupled to the valve unit in fluid communication with the passageway, the third conduit extending out of the pressurized compartment, with the valve unit and the first, second and third conduits providing a vapor-tight and fluid-tight arrangement within the pressurized compartment.

3. The aircraft of claim 1, further comprising an aerial refueling system coupled to the first conduit, with the first conduit positioned to transfer fuel from the fuel tank to the aerial refueling system.

4. The aircraft of claim 1, further comprising an auxiliary power unit, with the first conduit positioned to transfer fuel from the fuel tank to the auxiliary power unit.

5. The aircraft of claim 1, further comprising an aerial refueling system coupled to the first conduit to receive fuel from the fuel tank, and wherein the aircraft includes a pressurized compartment housing at least one electrically operated component, and wherein the first conduit and the second conduit pass through the pressurized compartment.

6. The aircraft of claim 1, wherein the valve element is coupled to a remotely operable driver, the remotely operable driver being configured to automatically move the valve element in response to an input signal.

7. A method for moving fluid to or from a conduit, comprising:

moving a valve element of a valve from a second position to a first position, the valve element being in fluid communication with an access channel that is in fluid communication with a first conduit;

when the valve element is in a first position, passing fluid (a) to or from the first conduit, (b) through the valve via the access channel while the access channel is in fluid communication with the first conduit, and (c) through a wall of a second conduit disposed annularly around the first conduit, without passing the fluid to or from the second conduit; and wherein moving the valve element from the second position to the first position includes moving a piston in a passageway that has an opening in fluid communication with the access channel, the piston having first and second axially spaced apart heads, each sealably disposed against a wall of the passageway with multiple spaced apart seals, wherein the first and second heads are positioned on opposite sides of a reduced diameter portion of the piston that is not sealably disposed against the wall, wherein the first and second heads are on opposite sides of the opening in the passageway when the piston is in the second position, and wherein the first and second heads are on the same side of the opening in the passageway when the piston is in the first position.

8. The method of claim 7 wherein the first conduit extends between a fuel tank of an aerial refueling aircraft and an aerial refueling system carried by the aircraft, and wherein the method further comprises:

coupling a third conduit to the valve;

placing an end of the third conduit off-board the aircraft; and opening the valve to drain fuel from the first conduit to a location off-board the aircraft.

9. The method of claim 7 wherein the first conduit extends from a fuel tank of an aerial refueling aircraft, through a pressurized compartment of the aircraft and to an aerial refueling system carried by the aircraft, the valve being located in the pressurized compartment, and wherein the method further comprises:

accessing the pressurized compartment of the aircraft;

coupling a third conduit to the valve;

placing an end of the third conduit outside the pressurized compartment; and opening the valve to drain fuel from the first conduit to a location outside the pressurized compartment of the aircraft without passing the fuel into either the second conduit or the pressurized compartment of the aircraft.

10. The method of claim 7 wherein the first conduit extends between a fuel tank of an aerial refueling aircraft and an aerial refueling system carried by the aircraft, and wherein the first conduit includes multiple valves along its length, and wherein the method further comprises draining fuel from the first conduit to a location off-board the aircraft by opening the multiple valves.

11. The method of claim 7 wherein the first conduit extends between a fuel tank of an aerial refueling aircraft and an aerial refueling system carried by the aircraft, and wherein the first conduit includes multiple valves along its length, and wherein the method further comprises:

draining fuel from the first conduit to a location off-board the aircraft via one of the multiple valves; and venting the first conduit by opening another of the multiple valves.

12. The method of claim 7 wherein moving the valve element includes manually rotating a threaded actuator to slideably move the piston from the closed position to the open position.

13. The method of claim 7 wherein passing the fluid includes passing the fluid into the first conduit.

14. The method of claim 7 wherein passing the fluid includes passing the fluid out of the first conduit.

15. The method of claim 7 wherein passing the fluid includes at least one of:

passing fuel out of the first conduit to drain the first conduit;

passing fuel into the first conduit to fill the first conduit; and passing air into the first conduit to leak check the first conduit.

* * * * *